United States Patent [19]

Theodorides

[11] Patent Number: 4,666,202

[45] Date of Patent: May 19, 1987

[54] STORAGE UNIT

[76] Inventor: Panos Theodorides, 82 Linfield St., Holbrook, Mass. 02343

[21] Appl. No.: 883,917

[22] Filed: Jul. 10, 1986

[51] Int. Cl.[4] ............................................. B65D 13/00
[52] U.S. Cl. .................................... 294/161; 312/244
[58] Field of Search ...................... 294/161, 143, 159; 312/307, 244, 305, 265

[56] References Cited

U.S. PATENT DOCUMENTS

| | | | |
|---|---|---|---|
| 866,860 | 9/1907 | Herrmann | 294/161 |
| 1,444,268 | 2/1923 | Pfeffer | 312/244 |
| 1,490,814 | 4/1924 | Flanagan | 312/244 |
| 2,046,777 | 7/1936 | Geibel | 312/244 |

Primary Examiner—James B. Marbert
Attorney, Agent, or Firm—Wolf, Greenfield & Sacks

[57] ABSTRACT

A storage unit comprising a housing and a sleeve slidable within the housing. The housing has a vertical opening which is divided into slots by a plurality of bar stops. The sleeve has a plurality of shelves with spaces for holding containers which may be placed onto and removed from the shelves when the shelves and bar stops are in registration. When the bar stops and shelves are not aligned, the bar stops block the spaces adjacent to the shelves, and prevent the containers from accidentally being lost or removed from the shelves.

12 Claims, 4 Drawing Figures

STORAGE UNIT

FIELD OF THE INVENTION

The invention relates to a compact, portable storage device for accommodating a number of vertically stacked containers.

BACKGROUND OF THE INVENTION

The main problem encountered when moving devices in which articles are stored is accidental loss of the device's contents during transportation. Various methods have been utilized in the prior art to deal with this problem. For example, U.S. Pat. No. 866,860 teaches a packing and carrying device in which the transported objects are individually locked and secured against movement. U.S. Pat. Nos. 1,444,268 and 1,490,814 employ a sliding door which is secured in a closed position to prevent spillage. Both of these constructions are undesirably complicated and time consuming to use. A different, simpler solution is suggested in U.S. Pat. No. 152,550 which provides rings which support the rims of the stored articles, with the body of the article resting within the ring. A disadvantage of this construction is that it does not prevent the stored articles from falling out unless the device is carried in an upright position.

SUMMARY OF THE INVENTION

It is an object of this invention to produce a storage device which prevents accidental loss or removal of stored containers from the device while it is being transported.

Another object of the invention is to provide a storage device in which vertically arranged containers may be readily inserted or removed individually.

A still further object of the invention is to produce a device of the character stated which is light, compact, uncomplicated and inexpensive to produce.

The storage unit of the present invention comprises a housing and a sleeve vertically slidable therein. The housing has a vertical opening in its side which has a width sufficient to pass containers or other articles therethrough. The opening is divided into a plurality of vertically aligned horizontal slots by horizontal bar stops which are attached to the housing. The sleeve has a plurality of vertically stacked shelves with spaces thereabove for storage of articles. The shelves are equal in number to the number of bar stops. When the sleeve is inserted into the housing, articles may be inserted into or removed from the storage unit when the shelves and bar stops are aligned. When the shelves and bar stops are not aligned, the bar stops partially occlude the spaces adjacent to the shelves, thereby preventing accidental loss of articles from the shelves. A crank inserted through the base of the housing raises or lowers the sleeve within the housing so as to adjust the relative alignment of the shelves and the bar stops. The invention thereby allows a storage unit which provides ready access to stored articles while preventing accidental loss of the articles.

DESCRIPTION OF THE DRAWINGS

These and other objects and advantages of the present invention will be more clearly appreciated from the following detailed description with reference to the accompanying drawings in which.

DETAILED DESCRIPTION OF THE PREFERRED EMBODIMENTS

Figure 1:
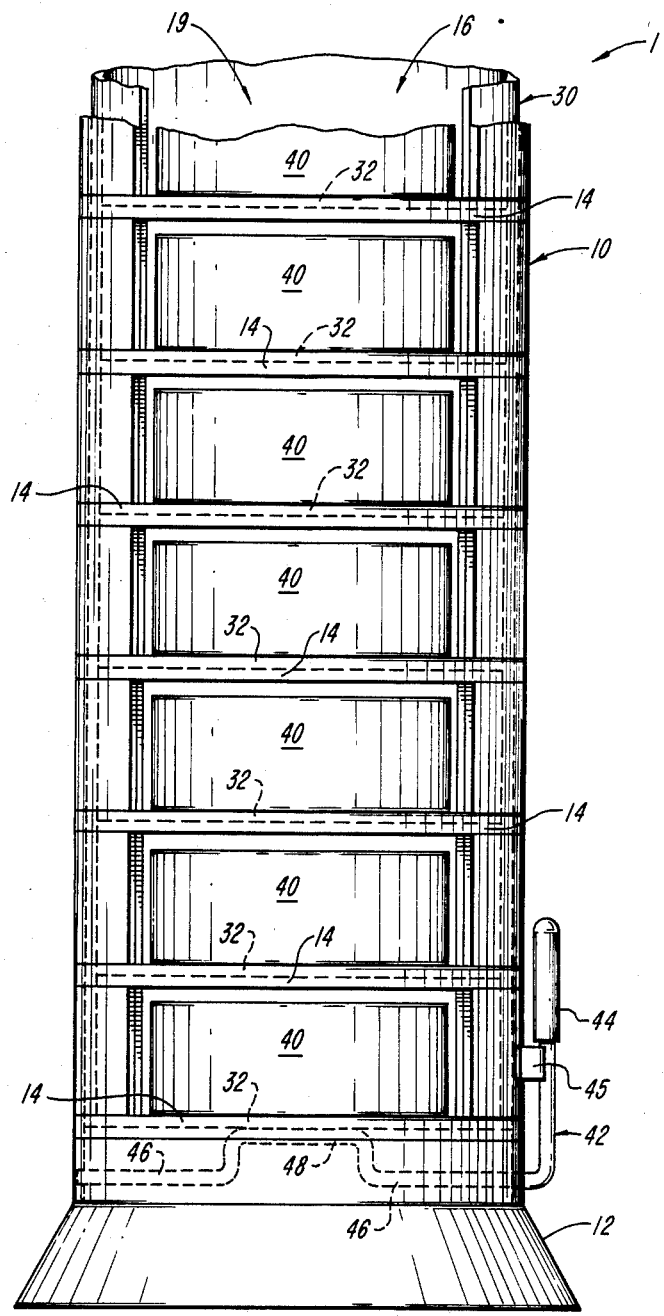
FIG. 1 is a front view of a storage unit showing a preferred embodiment of the invention.

With reference to FIG. 1, the storage unit 1 of the invention includes a housing 10 and a sleeve 30.

Figure 2:
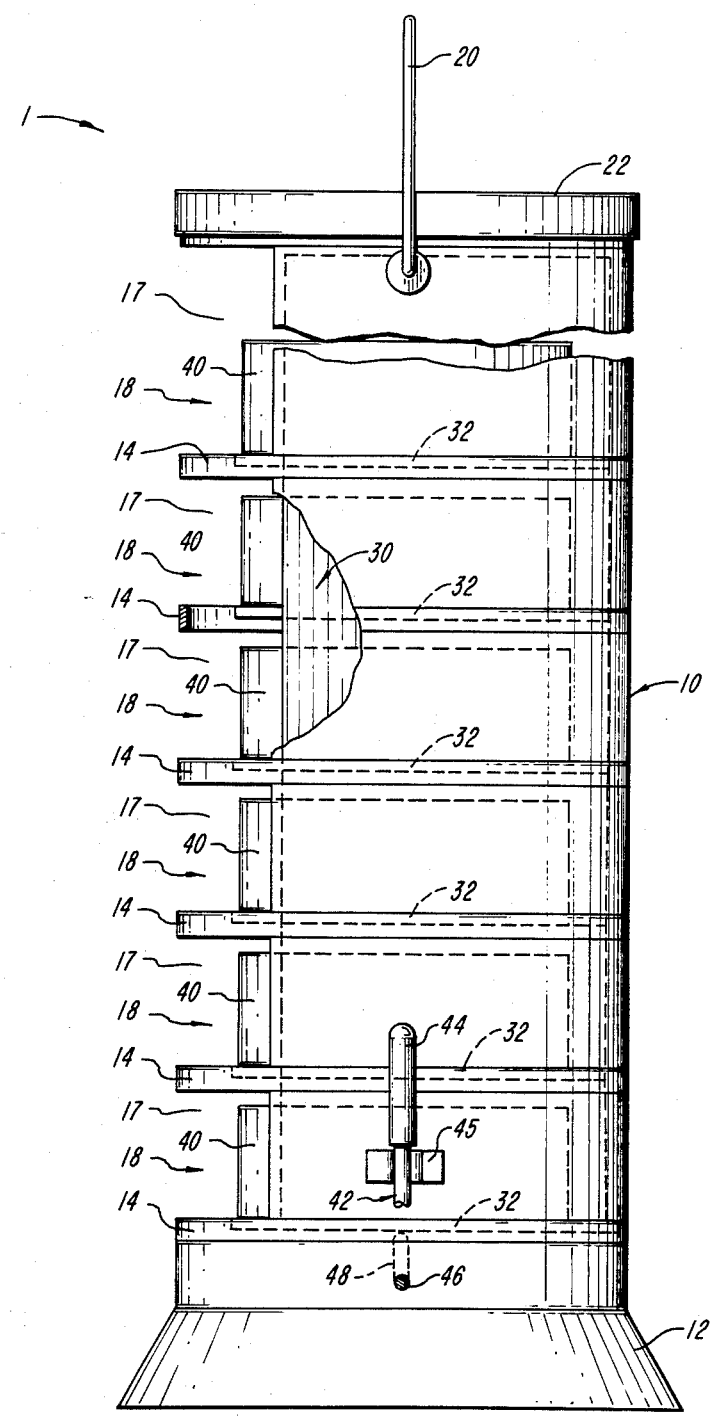
FIG. 2 is a side view of the storage unit of FIG. 1.

Housing 10 includes a base 12 and vertically spaced bar stops 14 extending across an opening 16. Housing 10 preferably is cylindrical in shape, although other shapes are included within the scope of the invention. Opposite ends of bar stops 14 are connected to housing 10 on opposite sides of opening 16, and bar stops 14 define a plurality of vertically aligned horizontal slots 17 as shown in FIG. 2. Although the vertical distance between bar stops is equal in the preferred embodiment, this distance may be varied to accommodate different sized containers 40.

Figure 3:
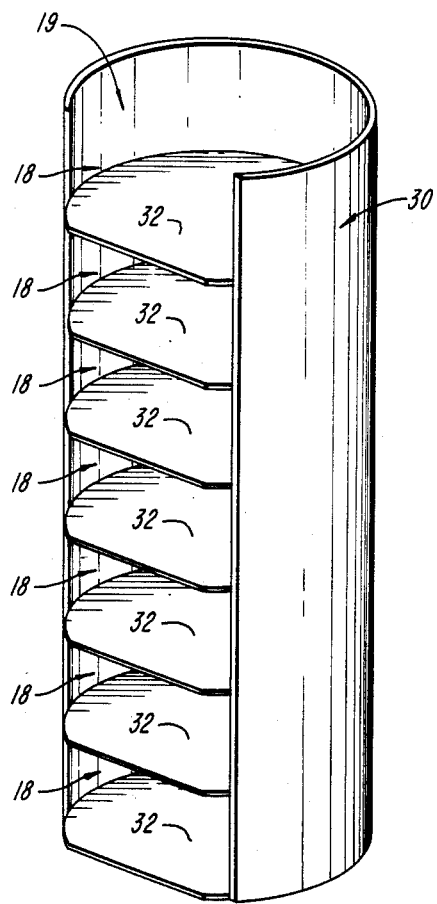
FIG. 3 is a perspective side view of the sleeve of the storage unit of FIG. 1.

As shown in FIG. 3, sleeve 30 is generally of the same shape as housing 10, which is cylindrical in the preferred embodiment. Sleeve 30 has an opening 19 in registration with opening 16. The diameter of sleeve 30 is slightly less than that of housing 10 so that sleeve 30 may be easily inserted into and removed from housing 10. Sleeve 30 contains within its interior a plurality of vertically spaced shelves 32 which are attached to the interior walls of sleeve 30 in a known manner. Each shelf 32 is associated with a bar stop and the spacing between adjacent shelves is the same as the spacing between associated bar stops 14. Stored articles may be placed in the spaces 18 between shelves 32. Both housing 10 and sleeve 30 may be made of a sturdy, lightweight material such as plastic or aluminum or the like.

Containers 40 (FIG. 4) may be provided to hold articles for storage in unit 1. Each container 40 is no wider than slots 17 and opening 19 so that it may be passed therethrough and placed on a shelf 32. Containers 40 are preferably made of a transparent sturdy plastic or the like so as to resist breakage, while allowing the stored article to be seen. However, other known materials may also be used to form containers 40.

Figure 4:
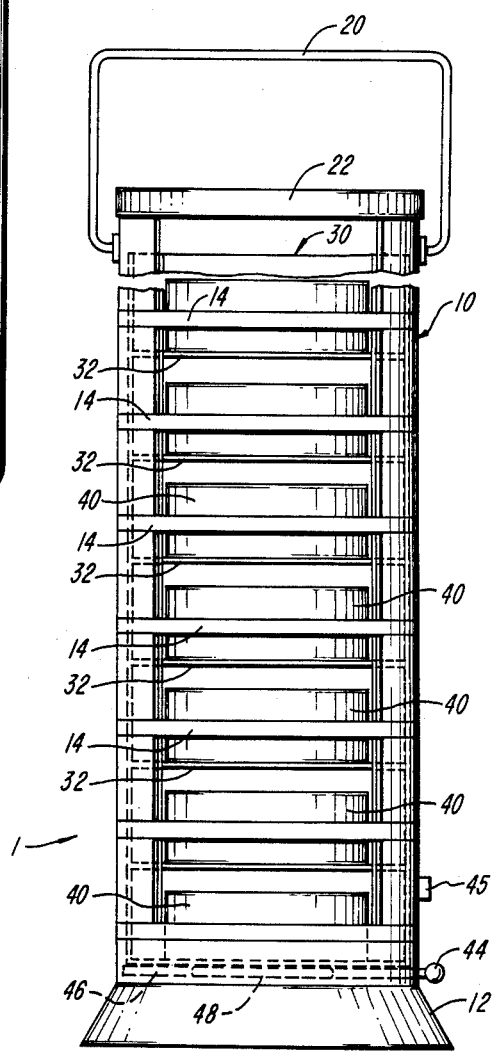
FIG. 4 is a front view of the storage unit of FIG. 1 showing the sleeve in a different position.

As shown in FIG. 1, when sleeve 30 is inserted into housing 10, containers 40 or other stored articles may be easily removed from or placed onto shelves 32 within housing 10 when bar stops 14 are aligned with shelves 32. However, as shown in FIG. 4, passage of the containers or other stored articles through opening 19 and slots 17 is not possible when the bar stops 14 are not aligned with the shelves 32, because the bar stops 14 partially block access to the spaces 18 above the shelves. This positioning of the bar stops 14 prevents accidental loss of articles from the shelves of unit 1, especially during transportation of the unit.

The sleeve is raised and lowered within the housing by a crank 42, to effect changes in the relative alignment of bar stops 14 and shelves 32. Crank 42, which passes through base 12 of housing 10 and extends across the width of housing 10, has an exposed handle 44, a shaft 46, and offset camming arm 48 included as part of shaft 46. Shaft 46 is rotatably disposed within base 12 and can be manually rotated by use of handle 44. Shelves 32 and bar stops 14 are normally not in alignment when handle 44 and arm 48 are horizontally disposed, as shown in FIG. 4. To raise sleeve 30 to create alignment of shelves 32 and bar stops 14, as shown in FIG. 1, shaft 46 is rotated in a first direction using handle 44 so that arm 48 is disposed at an angle to the horizontal and bears against the bottom of sleeve 30. Handle 44 and thus sleeve 30 are retained in this position by clamp 45 which grasps handle 44. Sleeve 30 may be lowered to again unalign shelves 32 and bar stops 14 by releasing handle 44 from clamp 45 and turning handle 44 in a second direction back to its original position so that the arm 48 does not bear against the bottom of 30.

It is to be understood that the foregoing arrangement can be reversed so that alignment is created when handle 44 and arm 48 are in a generally horizontal position and so that sleeve 30 must be raised to create non-alignment. However, the former arrangement is preferred so that if handle 44 is accidentally released from camp 45, the containers will be retained on shelves 32. Accidental loss caused by rough handling is prevented.

As shown in FIG. 2, a U-shaped carrying handle 20 may be attached to housing 10 to facilitate transportation of the storage unit 1. Handle 20 is pivotally attached to housing 10 so that it can be rotated to not interfere with insertion into or removal of sleeve 30 from housing 10.

A removable lid 22 is provided to cover the top of the housing after insertion of sleeve 30 to prevent accidental loss of articles through the top of housing 10.

In view of the above description, it is likely that modifications and improvements may occur to those skilled in the art within the scope of this invention. The above description is intended to be exemplary only, the scope of the invention being defined by the following claims and their equivalents.

What is claimed is:

1. A storage unit, comprising:
   a housing having an opening through which articles may be selectively inserted and removed;
   a generally horizontal bar stop attached to said housing which defines slots in said opening on either side of said bar stop;
   a sleeve which is vertically slidable within said housing, said sleeve having a generally horizontal shelf and a space disposed above said shelf for placement of articles to be stored; and
   means for changing the vertical position of said sleeve with respect to said housing to change the relative alignment of said bar stop with respect to said shelf and said space.

2. A storage unit according to claim 1 wherein said housing has a plurality of bar stops and wherein said sleeve has a plurality of shelves.

3. A storage unit according to claim 2 wherein the number of said bar stops equals the number of said shelves, and wherein each shelf is associated with a bar stop.

4. A storage unit according to claim 2 wherein said bar stops are equidistantly spaced from one another.

5. A storage unit according to claim 2 wherein the distance between each of said bar stops is unequal.

6. A storage unit according to claim 4, wherein the spacial arrangement of said shelves is the same as the spacial arrangement of said bar stops.

7. A storage unit according to claim 1, wherein said housing comprises a base in which said changing means is disposed.

8. A storage unit according to claim 1 wherein said changing means comprises:
   a crank having a shaft rotatably disposed with respect to said housing;
   a camming arm attached to said shaft; and
   a handle extending exteriorily of said housing for manual rotation of said shaft to rotate said arm into engagement with said sleeve to change the vertical position of said sleeve with respect to said housing.

9. A storage unit according to claim 1, further comprising a storage container which is adapted to reside on said shelf, said storage container being sized to be able to pass through said slot.

10. A storage unit according to claim 1, further comprising a lid for covering the top of said housing.

11. A storage unit according to claim 1 further comprising a handle pivotally attached to the top of said housing.

12. A storage unit comprising:
   a housing having a vertically extending opening;
   a plurality of vertically spaced bar stops extending across the opening in said housing;
   a sleeve disposed within said housing and being vertically slidable with respect to said housing, said sleeve having a vertically extending opening generally aligned with the opening in said housing;
   a plurality of vertically spaced horizontal shelves disposed within said sleeve, said shelves having spaces thereabove for storage of articles, each shelf being associated with a bar stop; and
   means for selectively raising and lowering said sleeve within said housing to change the alignment of associated shelves and bar stops to selectively block and unblock access to the spaces above said shelves.

* * * * *